Oct. 20, 1959     A. D. ISBELL     2,908,992
FISHING BOBBERS
Filed March 24, 1958

INVENTOR.
AUBREY D. ISBELL
BY
ATTORNEY

United States Patent Office 2,908,992
Patented Oct. 20, 1959

2,908,992
FISHING BOBBERS
Aubrey D. Isbell, Loveland, Colo.
Application March 24, 1958, Serial No. 723,401
1 Claim. (Cl. 43—44.95)

This invention relates to a bobber for fishing lines, and more particularly to means for attaching a bobber to a fishing line. The principal object of the invention is to provide a bobber of buoyant compressible material having a non-elastic tie member passing therethrough which terminates in hooked extremities so that the bobber may be instantly and securely attached to the fishing line at any desired point thereon by simply compressing the bobber and passing the line under the hooked extremities of the tie member, then allowing the bobber to expand to clamp the line in place against the hooked extremities so as to securely lock the bobber at any desired position on the line yet enable it to be instantly removed from the line by simply withdrawing the line from beneath the hooked extremities of the tie member.

Another object is to provide a bobber for fishing lines which will eliminate the necessity for the use of a tool of any kind for attaching or removing the bobber, and which will eliminate all knotting and tying of the line.

A further object of the invention is to provide a fish line bobber having the above described advantages, which will be economical to manufacture and practically indestructible.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

The improved bobber comprises a spherical ball 10 formed of aerated rubber, such as known as "sponge" rubber, and having a smooth rubber coating on the exterior, similar to the conventional children's play ball as used in playing "jacks." Such a ball contains a plurality of sealed air cells which renders it exceedingly buoyant in water.

Figure 4:
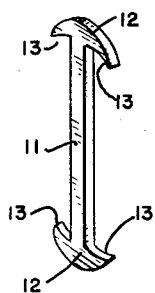
Fig. 4 is an enlarged, detail, perspective view illustrating a hooked tie member employed in the improved bobber.

In applying this invention to the ball, a hole is punched or formed diametrically therethrough and a hooked tie member is passed through this hole. The tie member is illustrated more in detail in Fig. 4, and comprises an elongated shank 11 having a length slightly less than the diameter of the ball 10. The shank 11 is provided, at each of its extremities, with a T-shaped head 12 which projects outwardly from both sides of the shank portion 11. The outer edges of the two heads are curvated on a convex contour and the inner edges of the projecting portions of the heads are curvated on a concave contour to provide two oppositely-projecting, hooked line-gripping surfaces 13 at each extremity of the shank. The convex outer edges of the heads 12 facilitate forcing the tie member through the hole formed in the ball 10 without damage to the latter.

When in place in the ball, the two heads 12 project slightly from opposite sides of the latter and since the shank 11 is relatively shorter than the diameter of the ball 10, the ball will be axially compressed by the heads 12 into the approximate shape of an oblate spheroid.

Figure 3:
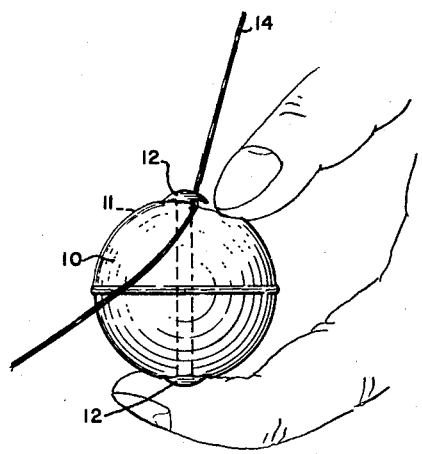
Fig. 3 illustrates a fishing line in the process of being attached to the improved bobber.

A fishing leader or line, as illustrated at 14, can be quickly and easily attached to the ball 10 by simply compressing the ball with the thumb adjacent one of the heads 12, as shown in Fig. 3, and slipping the line 14 under the gripping surface 13 at one side of the adjacent head thence around the shank and under the opposite gripping surface 13. The line is then passed longitudinally about the ball, with the latter under compression, and wrapped about the other extremity of the shank 11 beneath the gripping surfaces 13 of the opposite head 12.

Figure 1:
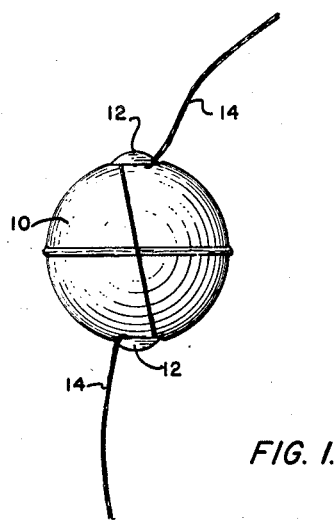
Fig. 1 is a side view of the improved bobber, illustrating it attached to a fishing line.
Figure 2:
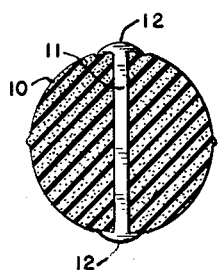
Fig. 2 is a vertical, diametric cross-section therethrough.

It will be noted that when the line is in place, as shown in Fig. 1, the resilient expansion of the ball 10 will cause it to securely clamp the line 14 at four places beneath the two heads 12 so that it will securely remain in the attached position. The line can be instantly removed from the ball by simply drawing it from beneath the line gripping surfaces 13 of the tie member.

As illustrated, the tie member is stamped from sheet metal so that the shank 11 will have a relatively rectangular cross-section. It could be cast or molded so that the shank 11 would have a cylindrical shape, if desired. The rectangular shape, however, provides relatively sharp edges on the gripping surfaces 13 to more securely grip the line thereto.

As described, the tie member is passed through the ball after the latter with its axial hole has been formed. It is conceivable that it could be placed therein at the time of molding the ball. It is essential, however, that the ball material should not be attached to the shank at its extremities and adjacent the heads 12 to enable the ball to be compressed inwardly away from the head for the attachment of the line. The tie member could be formed of plastic or other material. It is preferred, however, to form it of metal of a noncorrosive type, such as stainless steel.

While a specific form of the improvement has been described and illustrated herein, it is to be understood that the same may be varied within the scope of the appended claim, without departing from the spirit of the invention.

Having thus described the invention, what is claimed and desired secured by Letters Patent is:

A fishing bobber comprising a buoyant, compressible, resilient, spherical ball; a shank member passing diametrically through said ball; and a T-shaped head formed on each extremity of said shank, said heads projecting oppositely outward from the sides of the extremities of said shank, the distance between the heads at the opposite extremities of the shank being less than the normal diameter of said ball, the portions of said ball adjacent said heads being indented by the pressure of said heads so that the normal expansion tendency of said ball will force the surface of said ball at both sides of the shank and at both extremities of said shank against said heads for gripping a fishing line to the surface of said ball at both sides of both extremities of said shank.

References Cited in the file of this patent

UNITED STATES PATENTS

| | | |
|---|---|---|
| 2,560,129 | Rotehamel | July 10, 1951 |
| 2,694,844 | Grumbach | Nov. 23, 1954 |
| 2,758,410 | Cowsert | Aug. 14, 1956 |
| 2,772,509 | Vadnais | Dec. 4, 1956 |

FOREIGN PATENTS

| | | |
|---|---|---|
| 610,687 | France | June 14, 1926 |
| 771,349 | Great Britain | Mar. 27, 1957 |